July 7, 1970  A. S. IRWIN  3,519,260
FLAME AND HEAT RESISTANT RESILIENT LAMINATED BEARING STRUCTURE
Filed Aug. 22, 1967
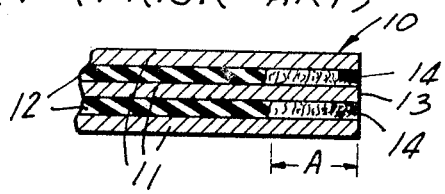
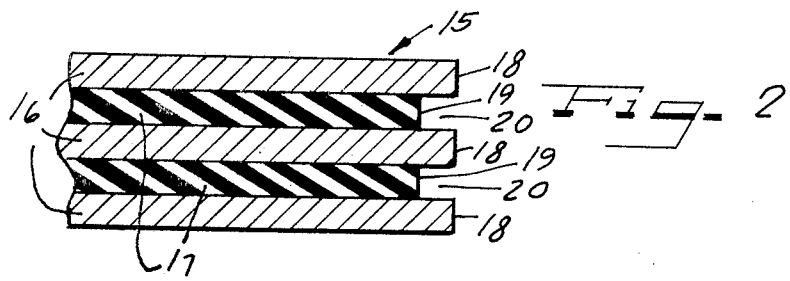
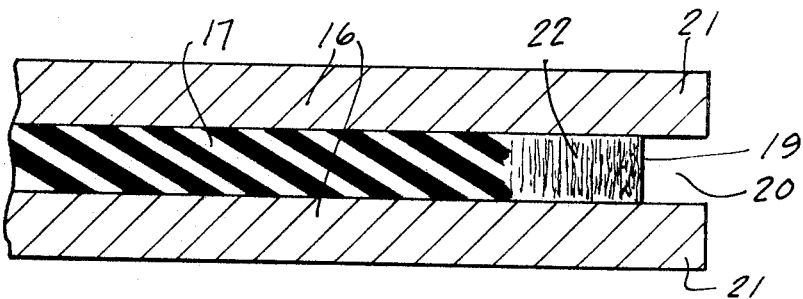
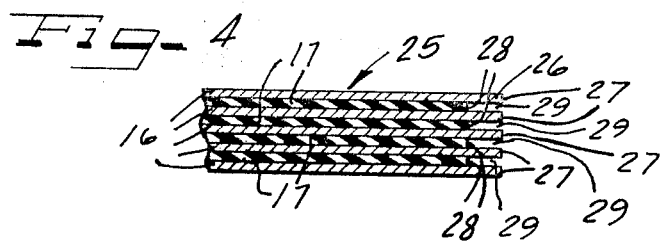
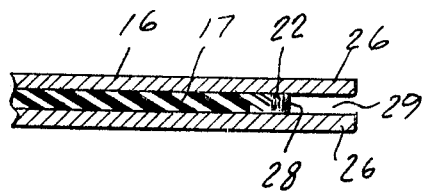
INVENTOR.
ARTHUR S. IRWIN

United States Patent Office 3,519,260
Patented July 7, 1970

3,519,260
FLAME AND HEAT RESISTANT RESILIENT LAMINATED BEARING STRUCTURE
Arthur S. Irwin, Jamestown, N.Y., assignor to TRW Inc., Cleveland, Ohio, a corporation of Ohio
Filed Aug. 22, 1967, Ser. No. 662,386
Int. Cl. F16f 1/38, 7/00; F16c 17/12
U.S. Cl. 267—152
2 Claims

ABSTRACT OF THE DISCLOSURE

A flame and heat resistant laminated bearing composed of alternate layers of bearing material and elastomer bonded together having peripheral flame traps created by the use of thin laminae with the bearing material layer peripheries extending beyond the elastomer layer peripheries.

BACKGROUND OF THE INVENTION

Field of the invention

This invention relates to laminated bearings and more particularly to a flame resistant laminated bearing.

Description of the prior art

Laminated bearings are known to the art, see for example the patent, Hinks No. 2,900,182. Such prior art laminated bearings utilized relatively thin laminae of alternate strips of bearing material and elastomer bonded together. Hinks teaches that the ratio of unbroken elastomers width to elastomer layer thickness ($w/t$ ratio) should be in excess of 20 and preferably in excess of 40 to render the bearing substantially incompressible. To provide the proper $w/t$ ratio the elastomer layers had the same surface area as the metal areas and the peripheries of the layers were in flush alignment. Such bearings are substantially incompressible under loads acting at right angles to the plane of the laminae while, due to the shear elasticity of the elastomer layers, being yieldable to torsional rotation. Because of these features, such bearings have been found to be extremely useful in many situations.

In some applications, laminated bearings must be exposed to excessive heat and/or flame. In such situations, while the metal layers of the bearing may hold up, the elastomer layers deteriorate from the peripheral portions which are exposed to the heat or flame. This deterioration adversely effects both the incompressibility of the laminated stack and the ability of the stack to accommodate torsional rotation.

SUMMARY

The bearing of this invention overcomes this deficiency in the prior art bearings and provides a laminated bearing which is capable of retaining both its incompressibility and its ability to accommodate torsional rotation when used in situations requiring exposure to heat and/or flame. The bearing consists of a laminated stack of alternate layers of metal and elastomer bonded together. The layers are thin and the peripheries of the bearing material layers extend beyond the peripheries of the elastomer layers. The extension of the bearing material layers beyond the elastomer layers provides flame traps between the bearing material layers.

The flame traps prevent a flame from reaching the elastomer of the elastomer layers. At the same time the extension of the bearing material layers provides heat radiating vanes along the periphery of the bearing. The combined action of the heat radiating vanes and the flame traps significantly decreases deterioration of the elastomer layers.

It is therefore an object of this invention to provide a laminated bearing composed of alternate bonded together layers of bearing material and elastomer having increased resistance to deterioration caused by exposure to heat or flame.

It is a further object of this invention to provide a laminated bearing consisting of alternate layers of bearing material and elastomer bonded together wherein the peripheries of the bearing material layers extends beyond the peripheries of the elastomer layers thereby decreasing the deterioration of the elastomer layers when the bearing is subjected to flame or heat.

It is a further and more specific object of this invention to provide a laminated bearing composed of alternate thin layers of bearing material and elastomer bonded together with the peripheries of the bearing material layers extending beyond the peripheries of the elastomer layers providing thereby flame traps between the bearing material layers and allowing the peripheral marginal portions of the bearing material layers to act as heat radiating vanes thereby increasing the ability of the bearing to withstand flame and/or heat.

BRIEF DESCRIPTION OF THE DRAWINGS

FIG. 1 is a fragmentary cross-sectional enlarged view of a prior art laminated bearing showing elastomer layer deterioration.

FIG. 2 is a fragmentary cross-sectional enlarged view of a thick-layer laminated bearing having bearing material layers extending beyond the peripheries of the elastomer layers.

FIG. 3 is an enlarged cross-sectional view of the bearing in FIG. 2 showing deterioration of an elastomer layer.

FIG. 4 is a fragmentary enlarged cross-sectional view of the bearing of this invention on the same scale as the bearing of FIG. 2.

FIG. 5 is a fragmentary enlarged view of the bearing in FIG. 4 on the same scale as the bearing of FIG. 3 illustrating the effects of exposure of flame or heat.

DESCRIPTION OF THE PREFERRED EMBODIMENTS

FIG. 1 illustrates a typical prior art laminated bearing 10 composed of alternate layers of bearing material 11 and elastomer 12 bonded together. Such prior art bearings are capable of withstanding loads applied at right angles to the plane of the layers while accommodating relative movement between the top and bottom layers by means of the shear elasticity of the elastomer layers.

However when an edge 13 of the bearing 10 is exposed to excessive heat or flame the marginal portions 14 of the elastomer layers 12 harden and deteriorate. If the hardened and deteriorated portions 14 of the elastomer layers 12 are restricted to a minor peripheral area the effect on the totality of the bearing is minimal, however, as exposure to heat and/or flame continues the deterioration of the elastomer layer 12 deepens. This deterioration and hardening of the elastomer layers adversely affects the bearing 10 inasmuch as it can change or alter the axial compression characteristics of the bearing stack while at the same time destroying the ability of the stack to accommodate relative movement by destroying the shear elasticity of the elastomer layers.

Extending the bearing material layers beyond the periphery of the elastomer layers as shown in FIGS. 2 and 3 is ineffective to prevent elastomer deterioration in relatively thick layered bearings. FIG. 2 illustrates a bearing stack 15 having relatively wide bearing material layers 16 and elastomer layers 17. The peripheries 18 of the bearing material layers extend beyond the peripheries 19 of the elastomer layers thereby providing air gaps 20 between the bearing material layers 16 out from the peripheries 19 of the elastomer layers 17. FIG. 3 illustrates the effect of flame or heat on a thick layered bearing. Because of the relatively high air gap 2 between the peripheral portions 21 of the bearing material layers 16 the flame or heat is able to reach the periphery 19 of the elastomer layer 17. In this embodiment the flame or heat again causes deterioration of the outside marginal portion 22 of the elastomer layer 17. Continued exposure to flame or heat deepens the deteriorated area 22 eventually causing bearing failure. The thickness of the bearing material layers 16 prevents the marginal portion 21 thereof which extend beyond the peripheries 19 of the elastomer layers 17 from effectively acting as radiating fins to radiate away the heat.

FIG. 4 illustrates the preferred embodiment of this invention. The bearing stack 25 consists of a plurality of relatively thin layers of bearing material 16 alternating with and bonded to relatively thin layers of elastomer 17. The bearing material layers 16 may be composed of metal, heat resistant plastic or the like material. A marginal portion 26 at the periphery 27 of each bearing material layer 16 extends beyond the periphery 28 of the elastomer layers. This extension provides flame traps 29 beyond the periphery 28 of the elastomer layers and between the marginal portions 26 of the bearing material layers 16.

FIG. 5 illustrates the effect of flame or heat on such a configuration. Because of the extremely thin elastomer layers and bearing layers 16 the flame trap 29 is relatively small in height compared to its depth. This effectively provides a space too narrow to support a combustible flame with the resultant effect that any flame is snuffed out before it can adversely affect the elastomer. In the embodiment illustrated the flame trap is at least 4 times as deep as it is high. However, it is to be understood that a different ratio may be used.

The marginal portions 25 of the bearing material layers, as a result of their relative thinness as compared to their depth effectively act as heat dissipating vanes. Because of the extreme thinness of both the bearing material and the elastomer layers, there are a great number of layers per unit of bearing stack height than is the case with thick layer bearings. Therefore, the number of bearing material marginal positions 26 which act as heat dissipating vanes is increased with a resultant increase in heat radiating exposed surface area. This increased surface area exposure improves the heat dissipation ability of the bearing stack.

It is to be assumed, for purposes of illustration only, that the bearings of FIGS. 2 and 4 are shown in the same magnification and that the magnification ratio between FIGS. 4 and 5 is the same as between FIGS. 2 and 3. As shown, the depth of the air gap 20 of FIG. 3 is the same as the depth of the flame trap 29 of FIG. 5 but the height of the flame trap 29 is much less than the height of the air gap 20. Therefore, the deterioration 22 of the elastomer of the bearing of FIG. 3 is much deeper than the deterioration 22 of the elastomer of the bearing of FIG. 5 and will have an adverse effect upon the performance of the bearing of FIGS. 2 and 3 while the minimal deterioration 22 of FIG. 5 will be such as to not effect the bearing of FIG. 4.

The flame and heat resistance ability of the preferred embodiment of this invention over the prior art bearings is even greater in the case of contact with combustible fluids. In the prior art bearings such as those illustrated by FIG. 1 the combustible fluid could burn directly against the periphery of the elastomer layers thereby bringing the fire into contact with the elastomer. However, in the preferred embodiment, because of the relation between the thin elastomer layer height and the depth of the flame trap as measured by the depth of the marginal torsions 26 of the bearing material layers 17, any combustible liquid filling the flame trap 29 would be unable to burn against the peripheries 28 of the elastomer layer. This is due to the snuffing action of the flame trap which would prevent entry of a sufficient amount of oxidizer to support combustion at the peripheries 28 of the elastomer layers 17.

It is, therefore, to be understood from the above that my invention provides for a flame and heat resistant laminated bearing composed of alternate relatively thin layers of elastomer and bearing material bonded together with the peripheries of the bearing material layers extending beyond the peripheries of the elastomer layers and providing thereby heat dissipation vanes around the periphery of the bearing stack and flame traps between the bearing material layers beyond the peripheries of the elastomer layers.

Although minor modifications might be suggested by those versed in the art, it should be understood that I wish to embody within the scope of the patent warranted hereon all such modifications as reasonably and properly come within the scope of my contribution to the art.

I claim as my invention:

1. In a laminated bearing composed of alternate layers of bearing material and elastomer bonded together the improvement of: relatively thin layers of elastomer and bearing material, said bearing material layers having marginal portions thereof extending beyond the peripheries of the said elastomer layers, flame traps between said marginal portions, the said flame traps having heat dissipation side walls composed of the said marginal portions and a height to depth ratio sufficiently small to prevent ambient atmosphere supplied oxidizer from reaching the outer periphery of the said elastomer layers in sufficient quantity to support oxidizer consuming combustion thereat.

2. The bearing of claim 1 wherein the said height to depth ratio is in excess of one to four.

References Cited

UNITED STATES PATENTS

| 2,900,182 | 8/1959 | Hinks | 267—57.1 |
| 2,982,536 | 5/1961 | Kordes. | |
| 3,083,065 | 3/1963 | Hinks et al. | 267—57.1 XR |
| 3,257,969 | 6/1966 | Thomas | 267—3 |

ARTHUR L. LA POINT, Primary Examiner

H. BELTRAN, Assistant Examiner

U.S. Cl. X.R.

29—148.7; 60—271; 64—11; 170—160.51; 239—265.17, 265.35; 267—57.1; 285—51, 223, 238, 263, 404; 287—85, 87; 308—2, 26, 237